UNITED STATES PATENT OFFICE 2,686,124

STABILIZATION OF FORAGE CROPS WITH HYDROQUINONE DERIVATIVES

Emanuel M. Bickoff, Berkeley, Calif., assignor to the United States of America as represented by the Secretary of Agriculture No Drawing. Application November 15, 1951,
Serial No. 256,589

20 Claims. (Cl. 99—8)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the preservation of forage crops. In particular, the invention relates to the treatment of dried forage crops, such as dried grasses, legumes, and especially alfalfa, so as to stabilize the carotene content of the forage material.

The problem with which this invention is concerned may be illustrated by the following reference to alfalfa:

Alfalfa is widely used as a feed and as an ingredient in mixed feeds for chickens, cattle, and other livestock. It is especially valuable for such purposes because of its high carotene content. Generally, alfalfa is used in the form of a meal prepared by harvesting fresh alfalfa, drying it and comminuting the dried alfalfa to a meal. In this form the alfalfa will not spoil and can be readily bagged for storage or shipping. One problem that has beset the industry, however, is that upon storage certain chemical changes take place whereby the carotene content is rapidly decreased. For example if the meal is stored at 80° F., it loses about two-thirds of its carotene content in 24 weeks. Of course at higher temperatures such as prevail in barns or warehouses in summer, the rate of carotene loss is greatly accelerated.

It has now been found that the carotene content of alfalfa or other forage crop can be stabilized by incorporating with the forage material an alkyl dialkylaminomethyl hydroquinone, or quinone, as hereinafter described. The hydroquinone derivatives which may be used in accordance with this invention are represented by the following formula:

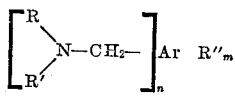

wherein:

R and R' are short-chain alkyl radicals, as for example, methyl, ethyl, propyl, isopropyl, n-butyl, sec-butyl, isobutyl, tert-butyl.

Ar is the nucleus of hydroquinone or quinone, that is

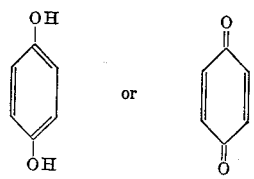

R'' is an alkyl radical containing at least 4 carbon atoms, as for example, n-butyl, sec-butyl, isobutyl, tert-butyl, amyl, hexyl, octyl, decyl, dodecyl, and so forth.

$n$ and $m$ are each an integer from 1 to 2.

Only a small proportion of the above-described agents are required to obtain the stabilizing effect, i. e. from about 0.01% to about 0.5% based on the amount of forage material. Obviously the higher proportions of stabilizing agent give the greater stabilization effect.

The agents are generally applied to the forage in the form of a solution or an emulsion so that the small proportion of this material can be applied uniformly. Suitable solvents are, for example, ethylene glycol monoethyl ether, deodorized kerosene, ethanol, n-propanol, iso-propanol, n-butanol, propylene glycol, and glyceride oils such as cottonseed oil, soybean oil, coconut oil, corn oil, peanut oil, sesame oil, and so forth. Glyceride oils, especially crude vegetable oils are preferred solvents as they reduce dustiness of the dehydrated forage and further in some cases, alfalfa, for example, they give it an enhanced green color. In using a glyceride oil as the solvent it is preferred to first dissolve the stabilizing agent in a small amount of acetone and then mix this solution with the oil. In this way solution of the stabilizing agent is more readily attained. Generally, the beneficial effect of the glyceride oil is attained when applied in a proportion of from about 0.5% to about 5%, based on the amount of forage. In preparing the emulsion form of the stabilizing agent, a solution of the stabilizing agent in any of the aforementioned solvents is first prepared and a small proportion of an emulsifying agent is dissolved therein. The resulting solution is then agitated with a large volume of water thereby to produce the emulsion. Many different emulsifying agents can be used, for example, sorbitan mono-oleate, the polyoxyalkylene ether of sorbitan mono-oleate, a polyglyceride of a glyptal resin, and so forth. The concentration of the stabilizing agent in the solution or emulsion is not critical, generally for convenience a 5 to 10% solution is used. The most convenient method of applying the solution of the stabilizing agent is to spray it onto the forage. To secure uniform impregnation, the forage is preferably agitated by suitable means during the spraying to expose all surfaces thereof to the spray. Thus one practical method involves tumbling the forage about in a rotating drum while the solution is sprayed into the interior of the drum. Another method involves allowing the forage to fall through a tower equipped with baffles while it is sprayed with the solution on its passage through the tower.

It is evident that any other apparatus or method which is adapted to obtain uniform impregnation can be used. The solution or emulsion of the stabilizing agent can be applied to the green forage, to the finished dehydrated forage, or it can be applied to the forage at various stages in its processing. Thus for example, the solution can be applied to the forage after it is dehydrated but before it is comminuted to form a meal. Further, the solution can be applied while dehydrated forage is being milled to produce the meal.

The following examples disclose steps and conditions within the scope of this invention. It is understood that these examples are furnished only by way of illustration and not limitation.

*Example I*

A 200 gram sample of dehydrated alfalfa meal was placed in a cylinder provided with baffles. While rotating the cylinder to cause thorough agitation of the meal, the meal was sprayed with 4 ml. of an ethylene glycol monoethyl ether solution containing 0.25 gram of 2,5-ditertiarybutyl-3,6-bis(dimethylaminomethyl) hydroquinone. The treated meal therefore contained 0.125% of the stabilizing agent.

Samples of the treated meal and a sample of the untreated meal (control) were stored in open vessels at 65° C. and the carotene content of each sample was determined after storage for 14 days at this temperature. The carotene content after storage was compared with the original carotene content of the meal to determine the proportion of original carotene remaining in the meal after storage. The following results were obtained:

| Sample | Proportion of original carotene remaining in meal after storage at 65° C. for 14 days, percent |
|---|---|
| Untreated sample (control) | 21.5 |
| Treated sample [0.125% of 2,5-ditertiarybutyl-3,6 bis (dimethylaminomethyl) hydroquinone] | 55.0 |

*Example II*

Samples of dehydrated alfalfa meal were sprayed with ethylene glycol monoethyl ether solutions of various other compounds in the same manner as set forth in Example I. In each case the compound was added in a proportion of 0.125%. The samples were stored and then assayed for carotene content as in Example I. The agents used and the results obtained are set forth in the following table:

| Expt. No. | Agent used | Proportion of original carotene remaining in meal after storage at 65° C. for 14 days, percent |
|---|---|---|
| 1 | None used (control) | 21.5 |
| 2 | 2,5-ditertiarybutyl-3,6-bis (dimethylaminomethyl) quinone | 44 |
| 3 | 2,5-ditertiaryamyl-3,6-bis (dimethylaminomethyl) hydroquinone | 53 |
| 4 | 2,5-ditertiaryamyl-3,6-bis (dimethylaminomethyl) quinone | 48 |

It has been established that the above-described hydroquinone derivatives stabilize the carotene content of forage crops. The mechanism of the stabilization is not known although the foregoing data indicate that the agent acts as a negative catalyst in preventing oxidation of the carotene. The powerful stabilizing effect of these compounds in this respect is surprising because many known anti-oxidants have little if any effect on the stabilization of carotene in alfalfa when used under conditions similar to those used with the compounds contemplated by the present invention. This fact is shown by the following experiments:

A series of 200-gram samples of dehydrated alfalfa meal were each treated with a solution of a known anti-oxidant using the spray technique set forth in Example I. In each case, the solution contained 0.25 gram of the anti-oxidant and was made up to a volume of 4 ml. with ethylene glycol monoethyl ether. In each case the treated meal contained 0.125% of the anti-oxidant. An untreated sample (control) and the treated samples were stored at 65° C. in open vessels and then analyzed for carotene content. The carotene contents after storage were compared with the original carotene content of the meal to determine the proportion of original carotene remaining in the meal after storage. The following results were obtained:

| Expt. No. | Antioxidant | Proportion of carotene remaining in meal after storage at 65° C. for 14 days, percent |
|---|---|---|
| 1 | none used (control) | 22 |
| 2 | nordihydroguaiaretic acid | 24 |
| 3 | thiodipropionic acid | 24 |
| 4 | lauryl thiodipropionate | 25 |
| 5 | ethyl gallate | 28 |
| 6 | propyl gallate | 26 |
| 7 | catechol | 25 |
| 8 | pyrogallol | 29 |
| 9 | hydroquinone monomethyl ether | 25 |
| 10 | p-tertiarybutyl catechol | 31 |
| 11 | diphenylamine | 34 |
| 12 | ethyl hydrocaffeate | 26 |
| 13 | 2,4-dimethyl-6-tertiarybutyl phenol | 26 |

Another point to be made is that the alkyl radicals designated by R″ in the formula above are critical components of the compounds of this invention. This fact is evidenced by the following experiment:

A sample of dehydrated alfalfa meal was sprayed with a glycol monoethyl ether solution of 3,6-bis(dimethylaminomethyl) hydroquinone to apply 0.125% of this agent. The sprayed alfalfa meal and an untreated sample (control) were stored in open vessels at 65° C. for 14 days. It was determined that the control sample retained 26% of its original carotene content and the treated sample retained 28% of the original carotene content. It is evident from this experiment that compounds lacking in the alkyl substituent R″ give virtually no carotene stabilization.

Having thus described my invention, I claim:

1. The process of stabilizing a forage crop which comprises incorporating therewith a compound selected from the group consisting of alkyl dialkylaminomethyl hydroquinones and alkyl dialkylaminomethyl quinones.

2. The process of stabilizing a forage crop which comprises incorporating therewith 2,5-ditertiarybutyl - 3,6 - bis(dimethylaminomethyl) hydroquinone.

3. The process of stabilizing a forage crop which comprises incorporating therewith 2,5-ditertiarybutyl - 3,6 - bis(dimethylaminomethyl) quinone.

4. The process of stabilizing a forage crop which comprises incorporating therewith 2,5- ditertiaryamyl - 3,6 - bis(dimethylaminomethyl) hydroquinone.

5. The process of stabilizing a forage crop which comprises incorporating therewith 2,5-ditertiaryamyl - 3,6 - bis(dimethylaminomethyl) quinone.

6. The process of claim 1 wherein the forage crop is alfalfa.

7. The process of claim 2 wherein the forage crop is alfalfa.

8. The process of claim 3 wherein the forage crop is alfalfa.

9. The process of claim 4 wherein the forage crop is alfalfa.

10. The process of claim 5 wherein the forage crop is alfalfa.

11. A stabilized forage product comprising a forage crop having incorporated therewith a compound selected from the group consisting of alkyl dialkylaminomethyl hydroquinones and alkyl dialkylaminomethyl quinones.

12. A stabilized forage product comprising a forage crop having incorporated therewith 2,5-ditertiarylbutyl - 3,6 - bis(dimethylaminomethyl) hydroquinone.

13. A stabilized forage product comprising a forage crop having incorporated therewith 2,5-ditertiarybutyl - 3,6 - bis(dimethylaminomethyl) quinone.

14. A stabilized forage product comprising a forage crop having incorporated therewith 2,5-ditertiaryamyl - 3,6 - bis(dimethylaminomethyl) hydroquinone.

15. A stabilized forage product comprising a forage crop having incorporated therewith 2,5-ditertiaryamyl - 3,6 - bis(dimethylaminomethyl) quinone.

16. The product of claim 11 wherein the forage crop is alfalfa.

17. The product of claim 12 wherein the forage crop is alfalfa.

18. The product of claim 13 wherein the forage crop is alfalfa.

19. The product of claim 14 wherein the forage crop is alfalfa.

20. The product of claim 15 wherein the forage crop is alfalfa.

References Cited in the file of this patent

UNITED STATES PATENTS

| Number | Name | Date |
|---|---|---|
| 2,394,456 | Korner | Feb. 5, 1946 |
| 2,513,002 | Chenicek | June 27, 1950 |
| 2,553,441 | Chenicek | May 15, 1951 |